Patented Jan. 27, 1953

2,626,965

UNITED STATES PATENT OFFICE 2,626,965

1,2,2,3,3,4-HEXACHLOROBUTANE

Park A. Wiseman, Muncie, Ind., assignor to The Firestone Tire & Rubber Company, Akron, Ohio, a corporation of Ohio No Drawing. Application October 18, 1949, Serial No. 122,129

1 Claim. (Cl. 260—658)

This invention relates to 1,2,2,3,3,4-hexachlorobutane and its production. This new compound is useful as an intermediate. By dehydrochlorination one or more other useful products are obtainable. For example, the production of 1,2,3,4-tetrachloro-1,3-butadiene by such dehydrochlorination is described and claimed in my co-pending application Serial No. 122,130 filed October 18, 1949.

1,2,2,3,3,4-hexachlorobutane is preferably prepared by chlorination of 2,3-dichloro-1,3-butadiene. The chlorinaton is advantageously effected by bubbling chlorine into a solution of 2,3-dichloro-1,3-butadiene in a halogenated hydrocarbon, preferably one of no more than two carbon atoms such as chloroform, carbon tetrachloride, methylene chloride, trichloroethylene, ethylene dichloride, ethylene dibromide, or any chlorinated or other halogenated methane or ethane. The solvents may contain a mixture of halogen substituents such as a chloro-fluorocompound, etc. Other solvents suitable for chlorination may be used such as benzene, heptane, dichlorobenzene, etc. However, it is not necessary to chlorinate a solution of the 2,3-dichloro-1,3-butadiene. In chlorinating the undissolved material it is desirable to heat it sufficiently to prevent crystallization of the hexachlorobutane as it is formed. In chlorination of the undissolved material, polymerization of the diene may be minimized by first reacting with one mole of chlorine and then reacting with a second mole of chlorine at a higher temperature. Chlorination with one mole of chlorine produces 1,2,3,4-tetrachlorobutene-2 and 2,3,3,4-tetrachlorobutene-1.

1,2,2,3,3,4-hexachlorobutane with a melting point of 105.5–7° C. is not to be confused with 1,1,2,3,4,4-hexachlorobutane described by Müller and Hüther, Berichte vol. 64, page 598 (1931) and said by them to have a melting point of 107° C. Mixtures of these hexachlorobutanes melt below the respective melting points of the two compounds.

The following examples illustrate the invention:

Example 1

Seven hundred thirty-two and five-tenths grams (5.93 moles) of 2,3-dichloro-1,3-butadiene which had been preserved with a polymerization inhibitor was distilled away from the inhibitor and then refrigerated with frozen carbon dioxide until used. It was melted and filtered into 500 cc. of chloroform chilled with frozen carbon dioxide. One thousand cubic centimeters of chloroform was placed in a 3-liter 3-neck flask fitted with stirrer, reflux condenser, dropping funnel, and a fritted-glass gas bubbler. The chloroform in the flask was saturated with chlorine at room temperature. Chlorine was bubbled in at the rate of 2-3 moles per hour. At intervals of about fifteen minutes increments of the dichlorobutadiene solution were added so that it entered the reaction mixture at approximately the same stoichiometric rate as the chlorine, preventing an accumulation of an excess of 2,3-dichloro-1,3-butadiene which would be conducive to polymerization. The temperature of the reaction mixture was permitted to rise to the reflux temperature of the chloroform solution (about 65° C.). Introduction of the chlorine was interrupted over-night and resumed through a simple glass tube instead of the bubbler. Chlorine addition was continued until the temperature of the reaction mixture dropped to 40° C., showing that the reaction was completed. After standing over-night the 1,2,2,3,3,4-hexachlorobutane (727 grams) that separated was filtered off. The filtrate was concentrated to about one-third its original volume, and about 200 grams of methanol were added. An additional 382 grams of crystals formed, and 31 more grams were obtained by further concentration of the mother liquor. The total crude yield was 72.7 per cent. On recrystallization from ethyl alcohol 1035 grams (69.3 per cent) of 1,2,2,3,3,4-hexachlorobutane (M. P. 105.5–7° C.) were obtained.

Example 2

The same procedure is followed as in Example 1 but using a solution of 732.5 grams of 2,3-dichloro-1,3-butadiene in 500 cc. of carbon tetrachloride instead of chloroform. A good yield is obtained.

Example 3

One hundred grams of 2,3-dichloro-1,3-butadiene are placed in an iron vessel equipped with external cooling means. With cooling and rapid agitation, chlorine is introduced at a rate to maintain an elevated temperature at which the reaction proceeds smoothly, but below the refluxing temperature. Toward the end of the reaction heat is supplied to maintain a high rate of reaction. A good yield of 1,2,2,3,3,4-hexachlorobutane is obtained with considerable polymeric material.

Example 4

One hundred grams of 2,3-dichloro-1,3-butadiene are placed in an iron vessel equipped with external cooling means. With rapid agitation and cooling to about 10° C. one molecular equivalent of chlorine is added at such a rate that all of it reacts with the chlorobutadiene and none escapes. Such low-temperature chlorination minimizes polymerization. A mixture of 1,2,3,4-tetrachlorobutene-2 and 2,3,3,4-tetrachlorobutene-1 results from the reaction with one molecular equivalent of chlorine. A second molecular equivalent of chlorine is introduced while the temperature is allowed to rise, but is maintained below the refluxing temperature. As there is no possibility of polymerization after the addition of the first molecular equivalent of chlorine has been reacted, a good yield is obtained.

Other conditions may be employed and the hexachlorobutane may be recovered in any desired manner. The reaction may be carried out at any temperature and pressure at which sufficient chlorine can be dissolved in the solvent. Both the 2,3-dichloro-1,3-butadiene and chlorine may be added continuously or in any desired manner. In general, temperatures between $-20$ and 150° C. will be used and those conditions will be selected which are known to favor addition of chlorine to double bonds rather than those which encourage substitution. Chlorination catalysts may be used, such as $SbCl_5$, $SnCl_4$, $I_2$, $FeCl_3$, etc.

What I claim is:

The process of producing 1,2,2,3,3,4-hexachlorobutane which comprises passing chlorine into undissolved 2,3-dichloro-1,3-butadiene at a temperature of about 10° C. until one molecular equivalent thereof has been added, and then passing in additional chlorine at a higher temperature but below the refluxing temperature until a second molecular equivalent thereof has been added.

PARK A. WISEMAN.

REFERENCES CITED

The following references are of record in the file of this patent:

UNITED STATES PATENTS

| Number | Name | Date |
|---|---|---|
| 1,965,369 | Carothers et al. | July 3, 1934 |
| 2,308,903 | Wimmer | Jan. 19, 1943 |

OTHER REFERENCES

Müller et al.: Ber. Deutsch Chemisch Gesell., vol. 64, pp. 589–90 (1931).